United States Patent [19]

Sirovich et al.

[11] Patent Number: 5,362,179
[45] Date of Patent: Nov. 8, 1994

[54] METHOD OF AND APPARATUS FOR CONTROLLING TURBULENCE IN A WALL-BOUNDED FLUID FLOW FIELD

[76] Inventors: Lawrence Sirovich, 37 Riverside Dr., New York, N.Y. 10023; Eugene Levich, 15 Rav Ashi Street, Apt. 62, Tel Aviv; Lucien Y. Bronicki, 5 Brosh St., Yavne, both of Israel

[21] Appl. No.: 175,180

[22] Filed: Dec. 29, 1993

Related U.S. Application Data

[63] Continuation of Ser. No. 978,415, Nov. 18, 1992, abandoned, which is a continuation-in-part of Ser. No. 794,875, Nov. 19, 1991, Pat. No. 5,263,793.

[51] Int. Cl.$^5$ ............................................. E02B 3/02
[52] U.S. Cl. ......................................... 405/52; 238/37; 238/39; 405/80
[58] Field of Search .................. 405/52, 80, 169, 170, 405/87; 138/39, 37

[56] References Cited

U.S. PATENT DOCUMENTS

| | | |
|---|---|---|
| 898,741 | 9/1908 | Isaacs . |
| 1,116,971 | 11/1914 | Barker . |
| 1,994,045 | 3/1935 | Nelson . |
| 2,143,477 | 1/1939 | Dillon et al. . |
| 3,000,401 | 9/1961 | Ringles . |
| 3,027,143 | 3/1962 | Furgerson et al. . |
| 3,175,571 | 3/1965 | Bankert . |
| 3,508,561 | 4/1970 | Cornish . |
| 4,310,028 | 1/1982 | Kennedy . |
| 4,932,610 | 6/1990 | Maestrello . |

FOREIGN PATENT DOCUMENTS

| | | |
|---|---|---|
| 427365 | 8/1911 | France . |
| 0932679 | 3/1948 | France . |
| 0340379 | 1/1931 | United Kingdom . |
| 0909384 | 2/1982 | U.S.S.R. . |

OTHER PUBLICATIONS

L. Sirovich et al., *Theoretical and Computational Fluid Dynamics*, "Propagating Structures in Wall-Bounded Turbulent Flows", Springer-Verlag, 1991, pp. 307–317.
L. Sirovich et al., "Plane Waves and Structures in Turbulent Channel Flow", *Phys. Fluids* A 2 (12), Dec. 1990, American Institute of Physics, pp. 2217–2226.
Mark's Standard Handbook for Mechanical Engineers, Eighth edition, McGraw-Hill Book Co.—Baumeister, Avollone and Baumeister, pp. 3-53-57.

*Primary Examiner*—Dennis L. Taylor
*Attorney, Agent, or Firm*—Sandler Greenblum & Bernstein

[57] ABSTRACT

Turbulence in a wall-bounded fluid flow field having a turbulent wall region characterized by a system of roll pairs extending in the direction of flow, and propagating structures interacting with the system of roll pairs, is controlled by introducing into the turbulent flow, a disturbance that changes the character of the propagating structures directed at an inclined angle to the direction of flow. Where the disturbance increases the amplitudes of the propagating structure, turbulent mixing or heating is increased; and when the disturbance decreases the amplitude of the propagating structure, the turbulent drag is decreased.

22 Claims, 3 Drawing Sheets

FIG. 5
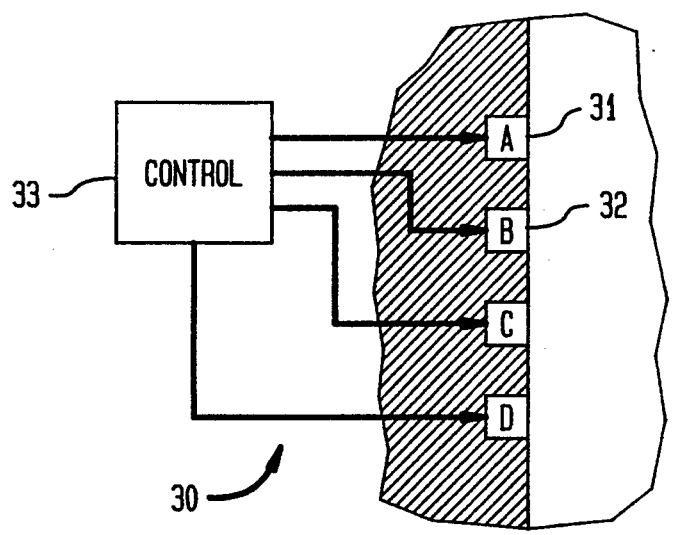
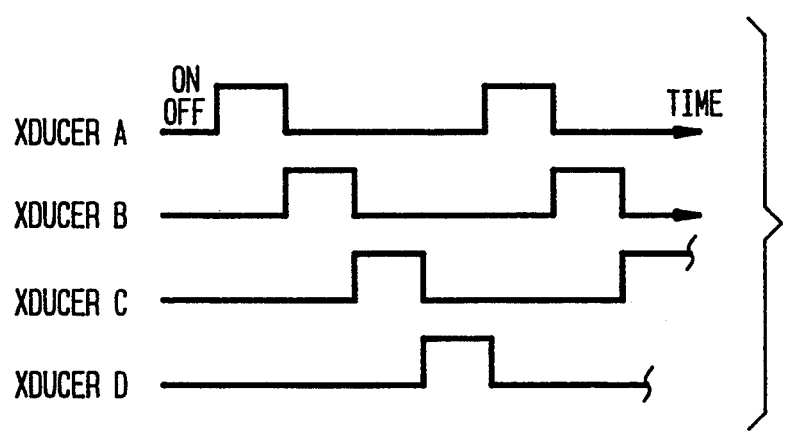
FIG. 6
FIG. 7
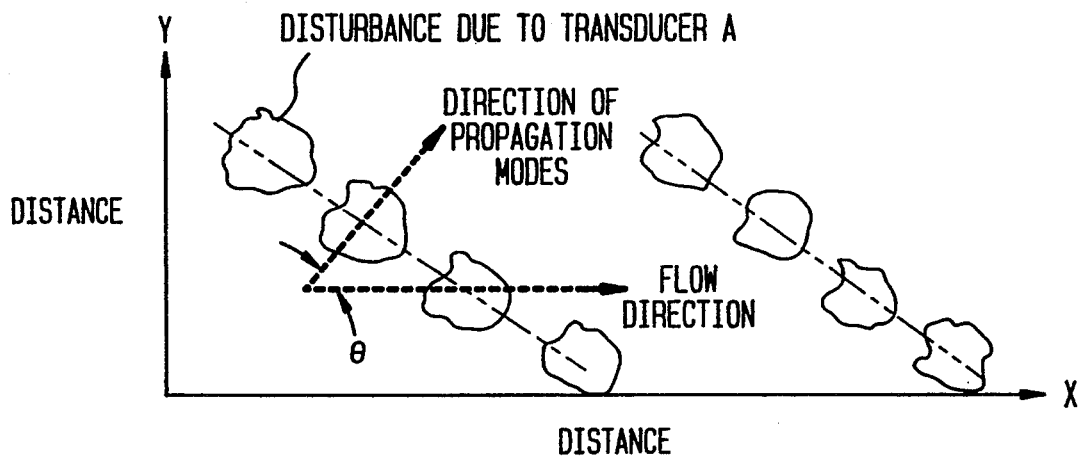

METHOD OF AND APPARATUS FOR CONTROLLING TURBULENCE IN A WALL-BOUNDED FLUID FLOW FIELD

This application is a continuation of application Ser. No. 07/978,415, filed Nov. 18, 1992, now abandoned, which is a continuation-in-part of U.S. Ser. No. 07/794,875, filed Nov. 19, 1991, which issued as U.S. Pat. No. 5,263,793 on Nov. 23, 1993.

RELATED APPLICATION

This application is a continuation-in-part of copending application Ser. No. 794,875 filed Nov. 19, 1991, the disclosure of which is hereby incorporated by reference.

TECHNICAL FIELD

This invention relates to a method of and apparatus for controlling turbulence in a wall-bounded fluid flow field.

RELEVANT PUBLICATIONS (1) "Plane Waves and Structures in Turbulent Channel Flow" by L. Sirovich, K. S. Ball, and L. R. Keefer, *Phys. Fluids* A2(12), December 1990, p2217–2226.

(2) "Propagating Structures in Wall-Bounded Turbulent Flow", L. Sirovich K. S. Ball and R. A. Handler, *Theoret. Comput. Fluid Dynamics* (1991), 2:307–317.

BACKGROUND ART

From the viewpoint of classical fluid mechanics, turbulence is perceived as a chaotic condition with the excitation of all possible degrees of freedom. This perception is supported from direct observation of large scale activities, such as weather patterns in the atmosphere and water flowing in a pipe, to mundane experiences like stirring cream into coffee, or mixing paint.

Turbulence can be harmful or helpful: it produces undesired drag on a car or an airplane; but it effects mixing fuel with air in an engine, or rapidly distributing heat in a room. Turbulence has had an enormous impact on human experience, but its perception as a chaotic condition has resisted scientific analysis until recent years. With the advent of super computers which permit the numerical investigation of wall-bounded turbulent flow, and the performance of modern experiments, there has been a dramatic shift in the perception of turbulence. Where it was once viewed as being a chaotic condition, turbulence is now viewed as having coherent patterns of activity in the midst of apparent chaos.

Careful scrutiny of a wall or boundary of streaming turbulent flow, as for example, in the case of air flow over an airplane wing, or liquid flow inside a pipeline, has shown the presence of coherent structures in the form of pairs of counter-rotating streamwise rolls adjacent the walls, but located at the outer edge and beyond the sublayer. These rolls, which are sometimes referred to as streaks, show considerable meander and variation in their dynamic activity. Of great importance is their sudden contortion or kinking, resulting in a sudden bursting forth of slow moving fluid from near the wall into the fast moving main body of fluid motion. This bursting results in a net drag on the walls. It has been estimated that these bursts, which account for 80% of the drag on a wall, occur only roughly 20% of the time. Again, a study of the patterns of such flow shows that the contortion of the rolls undergoes a stereotypical coherence pattern through temporal change that is typical of all wall-bounded turbulence.

To specify the width of the streaks, it is first necessary to recognize that the streaks are a manifestation of local conditions beyond the sublayer of the flow adjacent to a wall, and not the nature of the wall, nor the flow field significantly spaced from the wall. Local conditions are fully specified by the average frictional stress at a wall, s, the density of the fluid, r, and the viscosity of the fluid, m. These quantities define a local size dimension, or length scale $l*$ which is usually referred to as a wall unit and is equal to $m/(sr)^{\frac{1}{2}}$. The dominant roll diameter is roughly 100 wall units, or 200 $l*$ per pair.

The term "dominant", in referring to the roll diameter, means that the greatest amount of turbulent energy (of the fluctuating velocity) resides in modes of activity of this size. There is, in addition, other modes of the same roll type, having a range of sizes and which also contain significant amounts of turbulent energy. In summary, the major contribution to drag on a wall arises because of the disruption of the orderliness of these roll type modes, to their contortion, and finally to the relatively violent bursting events that mixes slow moving fluid into more rapidly moving fluid.

This picture of the events in wall-bounded turbulence was significantly enhanced with the discovery that propagating structures are also present in the turbulent wall region. In reference (1) cited above, it is shown that propagating structures are coherent patterns which propagate at a constant group speed. In reference (2) cited above, the existence of propagating modes was further confirmed. As an aside, a literature search produced a paper written 20 years ago in which experiments on wall turbulence hinted at, but did not directly suggest, the presence and function served by such propagating modes in turbulent flow.

As it is argued in the above cited publications, the propagating modes act as triggers for the bursting events that give rise to the drag producing events found in turbulent wall-bounded flows. Although the propagating modes carry relatively little energy themselves, bursting events do not occur unless the propagating modes are present. In addition, the experimentally and numerically measured time courses of the bursting events corresponds to that of the propagating modes. The most energetic, and therefore the most important of the propagating modes, are those that propagate at an angle of about 65° from the streamwise direction; and those in the range 50°–80° have the dominant energy content of the propagating modes.

The wavelengths of the triggering modes are also an important factor. Those waves with wavelengths comparable to the roll size play a significant role in the bursting events.

The most significant triggering modes have a lateral extent which is comparable to the wavelength of the energy bearing roll modes. This strongly implies the existence of a resonance mechanism which, through the triggering operation, facilitates ejection of the roll modes. For reference purposes, the main triggering modes are sometimes referred as the long wavelengths modes. There are no significant longer wavelength modes present, but many shorter wavelength modes are present.

It is therefore an object of the present invention to provide a method of and apparatus for modifying and managing turbulent flow through a modification of the trigger modes.

BRIEF DESCRIPTION OF THE INVENTION

The present invention controls turbulence in a wall-bounded fluid flow field having a turbulent wall region characterized by a system of roll pairs or streaks extending in the direction of flow by introducing into the turbulent wall region, a disturbance field that is strongly coupled to, and modifies propagating structures that interact with the system of roll pairs. The disturbance field effects changes in those propagating structures interacting with the system of roll pairs for the purpose of increasing turbulent mixing in one extreme or decreasing turbulent drag in another extreme. Preferably, the disturbance field is modulated by the resonant wavelength which is in the range 100–300 l∗, where l∗ is the size of a wall unit. The preferred amplitude of the disturbance is in the range 10–20 l∗.

BRIEF DESCRIPTION OF DRAWINGS

Embodiments of the present invention are shown by way of example in the accompanying drawings wherein:

FIG. 5 is a cross-section of a wall-bounded fluid flow field taken in a direction perpendicular to the direction of fluid flow showing a plurality of transducer elements, such as heaters, ultrasound generators, etc. embedded in the wall surface;

FIG. 6 is a nominal time diagram showing the manner in which the various transducers are timewise activated;

FIG. 7 is a plan view of the fluid flow field shown in FIG. 5 showing a nominal distribution of disturbances introduced into the fluid flow by reason of the timewise activation of the transducers in accordance with the diagram shown in FIG. 6;

DETAILED DESCRIPTION

Recent and as yet unpublished research has focused on modifying and managing turbulent flow by modification of the triggering modes. In a series of computer stimulations, turbulent flow driven down a channel with fixed walls has been considered. During the course of the simulations, distortion was applied to selectively chosen triggering modes. The randomization of the phases of the motion was chosen as the means of distortion. In effect, this suppressed long wave motions. There is nothing special about the method of phase randomization; and other distortion methods would work as well. It was found that by randomizing the phases of just the long wavelength propagating modes, the flow rate was increased by more than 30%. Associated with this effect is an indication that drag reductions of more than 40% can be achieved. The randomization of modes other than the long wavelength modes produced little or no effect. On the other hand, enhancement of the amplitudes of the long wavelength propagating modes substantially increases turbulent mixing. This provides strong substantiation that the interaction of the wave and roll modes are fundamental to the bursting mechanism.

Figure 1:
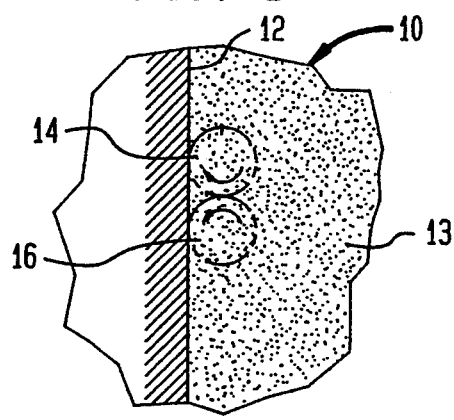
FIG. 1 is a cross-section showing wall-bounded fluid flow, where the cross-section is taken perpendicular to the direction of flow.

Referring now to the drawings, reference numeral 10 designates a wall-bounded turbulent flow field including wall 12 restraining fluid 13 containing local structures in the form of counter-rotating rolls 14, 16 of fluid. The axes of these rolls, or streaks as they are sometimes called, lie in the direction of fluid flow which is into the paper showing FIG. 1, and as indicated by arrow 17 in FIG. 2. Details of the nature of these rolls are contained in reference (1), FIG. 10, page 2223. Briefly, these counter rotating rolls have diameters that are a function of the strength of the flow, and a length much greater than their diameters (in excess of 1000 l∗). As indicated above, the dominant roll diameter is roughly 100 l∗, or 200 l∗ per pair.

In fully developed turbulent flow, these local roll structures travel downstream through-out the near wall region, are disrupted, contort, and finally burst. It is the interaction between the coherent structure of propagating modes present in the flow with the coherent structure of the rolls that result in the bursting of the rolls, and the consequent mixing of slow moving fluid near the boundary with rapidly moving fluid in the main flow and vice versa.

The present invention provides both passive and active mechanisms for controlling the triggering aspects of the wave propagating modes which cause bursting of the roll-modes in turbulent wall-bounded flows. A passive mechanism, according to the present invention, for controlling the wave propagation modes is the presence of shape modifications, such as grooves, undulations, etc. on the walls containing the turbulent flow. For example, the shape modifications can be achieved by actually grooving the walls, or by applying to the walls an adhesive layer which contains the required shapes. When the shape modification is in the form of undulations, their amplitude should be in the range 15–20 wall units in order to include the location of peak turbulence production. The wavelength or pitch of typical undulations will depend on the objective of the turbulence management. The orientation of the undulations, i.e., the direction of the troughs between the peaks of the undulations, should be inclined at about 15°–30° off the streamwise direction. That is to say, the "propagation" direction of the undulations should be about 60°–75° from the streamwise direction.

Figure 2:
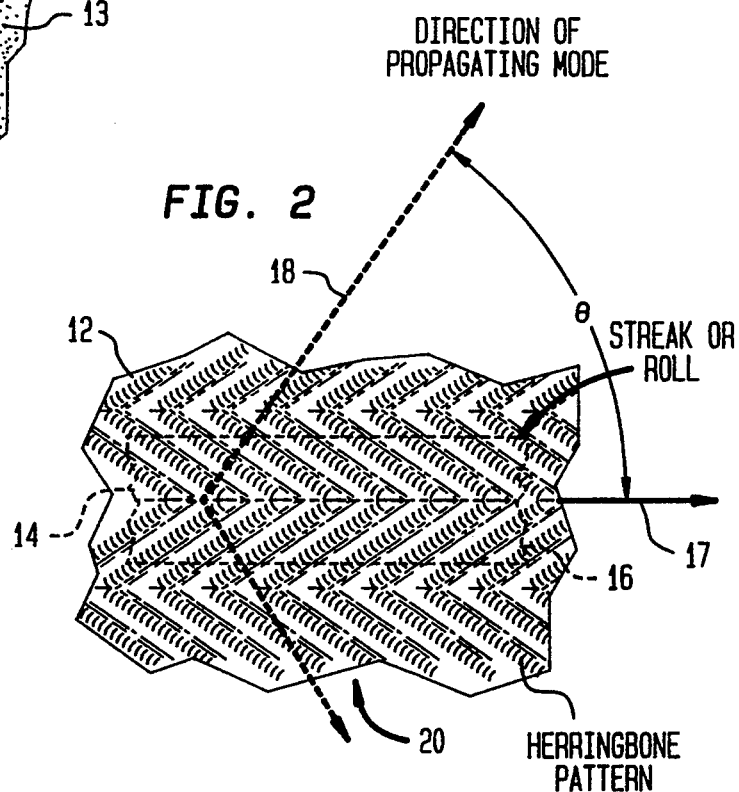
FIG. 2 is a schematic plan view of the fluid flow field shown in FIG. 1 showing streaks or rolls adjacent a wall boundary having herring-bone undulations.

FIG. 2 shows a plan view of rolls 14, 16; and superimposed on these rolls are waves that propagate (the propagating modes) whose direction is indicated by arrow 18 making an angle $\pm\theta$ with the flow direction 17. As indicated above, $\theta$ lies in the range 50°–80° for the waves having the dominant energy content. To account for the possible bidirectional angle of the propagating modes, the undulations are preferably in the form of herring-bone pattern 20 as shown in FIG. 2, or a complete cross-hatched or "knurled" pattern.

Figure 3:
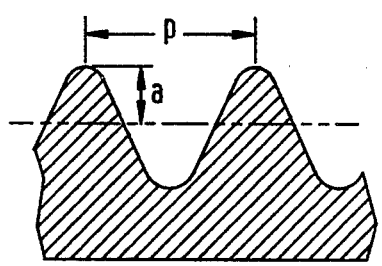
FIG. 3 is a cross-section through the wall showing the undulations.

In order to enhance mixing and, for example, increase heat transport, (i.e., increase turbulence), and therefore to encourage the eruption of bursts, the undulations should be ordered in a strictly sinusoidal pattern as indicated in FIG. 3. The wavelength p is preferably in the range 100–300 wall units in order to achieve resonance with the triggering modes, and the amplitude a is preferably in the range 15–20 wall units.

Figure 4:
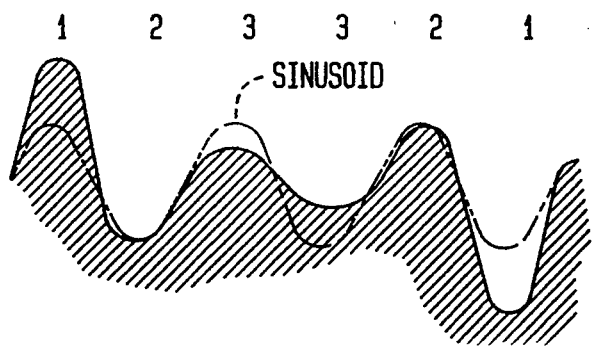
FIG. 4 is a modified version of the undulations.

In order to reduce drag, the undulations should be given a pattern that introduces phase interference in the waves in a manner that is analogous to the above-mentioned phase randomization. One method for achieving this is by creating a "chaotic" pattern modulation by the resonant wavelength, and containing a suitable sum of incommensurate sinusoids ranging down in wavelength. A model cross-sectional plot is given in FIG. 4.

In addition to the use of passive mechanisms for interacting with the wave propagation modes to control turbulence, the present invention also contemplates the use of active devices for this purpose. Embodiment 30, shown in FIG. 5, is an example of an active device. As shown, flush mounted wall transducers in the form of heating elements 31, 32, etc. are activated by transducer control 33 in the form of a heater control. The operation of heater control 33 is to pulse the heaters in time-sequence to effect local heating of the fluid in the same patterns as those generated by the undulations in the wall surface of the bounded flow. Thus, the localized heating will create wave patterns of varying densities which either inhibit or enhance the bursting activity.

Control modes 33 may activate the heaters in sequence as shown in FIG. 6 providing a spatial distribution of disturbances as indicated in FIG. 7. Wave modes, or patterns, which introduce phase interference in the wave modes can be established by the thermal patterns in a fashion analogies to that of the undulations described above.

Both of the above described mechanisms effect control over the triggering mechanisms, and are suitable for steady-state flow conditions. In both instances, the placement of the patterns is fixed, whether by surface modification or by appropriate positioning and pulsing of heat elements. The fixed pattern is prescribed by condition of the flow as specified by its parameters (e.g., the Reynolds number).

Other applications effect control over turbulence under variable flow conditions. Wall-mounted heating elements can be mounted in bands perpendicular to the flow direction. These elements can be triggered subsequently in time in order to create an oblique wave of any angle. By suitably triggering, or pulsing a grid of heating elements, any pattern of activity can be established to either enhance or diminish the bursting phenomenon. This will allow the application of these considerations to cases where there is a variable flow rate (i.e., a variable Reynolds number).

Phase randomization, on the one hand, and phase enhancement on the other, of the disturbances introduced into the fluid flow, can also be achieved by means of sound wave generation either with wall-mounted acoustic generators, or with externally mounted sound generators positioned as indicated by the transducers in FIG. 5. Phase enhancement of the triggering modes leads to increase mixing of the fluid flow may be established through the standing wave patterns. Asynchronous sound generation resulting in patterns described above in connection with the undulated surface, can be created by suitably driving arrays of acoustic generators. Variable flow rates can be treated by suitable programming of the acoustic drivers.

The same effect of phase randomization, or enhancement of triggering modes, can be achieved by wall mounted vibration transducers producing vibrations of the wall in an appropriate pattern, with consequent transmission of the vibrations into the flow. The sound or acoustic generators, or vibration transducers may be mounted as arrays at the side walls of a duct, or on the circumference of a pipe, or on the wall(s) of other wall bounded flow.

The present invention can also be carried out in a wall-bounded fluid flow system wherein the fluid is electrically conductive as, for example, sea water. In such case, the disturbance can be introduced by a varying magnetic, or electro-magnetic field associated with, or adjacent to the wall(s) in order to introduce the desired disturbance, or to effect changes, in the the propagating structures or modes in the manner previously described.

The present invention is particularly applicable to ducts, curved ducts, pipes, curved pipes, compressors, pumps, and turbines so as to reduce turbulence. The invention is also applicable to combustion chambers in internal combustion engines, and the like such that mixing in the chambers is enhanced to promote combustion.

If the turbulent fluid is electrically conducting, or weakly conducting, as in the case of sea water, electrical means are available for establishing the wave patterns discussed thus far. Wall-mounted electrodes positioned as shown by the transducers in FIG. 5 can be used to set up currents which can be used for local heating, or coupled to magnetic fields, to establish local forces. These can be used to manage the appropriate wave patterns discussed above. Finally, wall-mounted strain gauges, pressure gauges, thermocouples, or any other fine scale measuring devices, can be used to detect the onset of the triggering propagating waves. These signals can be used in a feedback loop with either thermal, acoustic, or electrical scheme either to selectably enhance or to destroy the evolving triggering propagating modes.

While the present invention is disclosed herein in relation to turbulent flow in wall-bounded fluid flow fields, the above described methods and apparatus of the present invention can be used in turbulent boundary flows such as occur adjacent bodies moving in a fluid. Thus, the invention is applicable to bodies moving in air (e.g., wheeled vehicles on the ground, and aircraft), and bodies moving in water (e.g., ships), etc.

In addition, the above described methods and apparatus, the present invention also can be carried out in a boundary layer flow system wherein the fluid is electrically conductive as, for example, sea water. In such case, the disturbance can be introduced by a varying magnetic, or electro-magnetic field associated with, or adjacent to a body such as a vessel being operated in sea water in order to introduce the desired disturbance, or to effect changes, in the the propagating structures or modes in the manner previously described.

Figure 8:
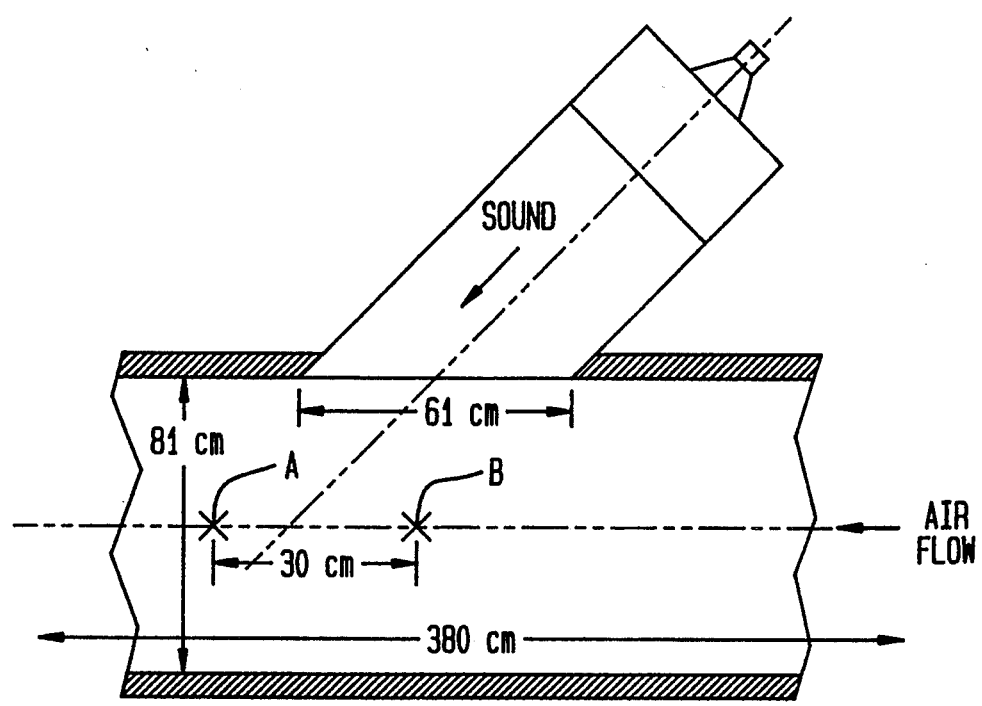
FIG. 8 is a plan view of a test section of a wind tunnel showing a sonic generator attached to one side of the test section.
Figure 9:
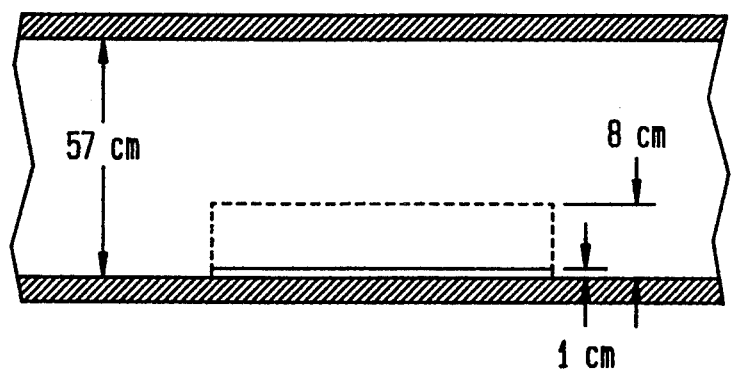
FIG. 9 is a side view of the test section showing the slit by which a sonic disturbance is introduced into turbulent flow in the test section.

In an actual physical experiment, a substantial reduction (9%) in turbulent drag was observed when a relatively weak sound generator was used to introduce a a sonic disturbance within the test section of a wind tunnel. FIG. 8 shows the relationship between a sonic resonator used in the experiment and the test section. As indicated, the test section of the wind tunnel was about 57 cm. high × 81 cm wide, and had a length of about 380 cm. A sound generator was attached to the side of the test section at an angle of about 65°. The sound generator was in the form of a resonator box having a tapered section about 22 cm. long and measuring about 61 × 22 cm. at an end to which a loud speaker was attached and about 8×61 cm. opposite the speaker. Attached to the tapered section was linear section having a length of about 42 cm. on one side and a length of about 72 cm. on the opposite side. The free end of the linear section was blocked off to produce a slit 1 cm. high×61 cm. long. The slit was positioned in alignment with a wall of the test section.

Measurements were made using a straight hot wire at two points 30 cm. apart near a wall of the test section. One of the points coincided with the axis of the resonator box and was located about 190 cm. into the test section.

At the axis point, the turbulent boundary layer thickness was 48 mm. for flow with a Reynolds number of $7.7 \times 10^5$ based on the free stream velocity. A drag reduction of about 9% was obtained with the loud speaker driven by an amplifier that produced an audio signal whose driving frequency was about 170 Hz. with its phase randomized in the range 0°-360° at 426 Hz. in accordance with a study reported in "Drag Reduction in Turbulent Channel Flow by Phase Randomization" by A. R. Handler, E. Levich, and L. Sirovich, *Phys. Fluids*, the disclosure of which is hereby incorporated by reference. The frequencies, or the wavelengths, used in the acoustic disturbance introduced into the test section was in accordance with those specified in the present invention, namely in the range 100-300 l* (where l* is a wall unit).

Further, various mechanical means also may be provided for introducing the desired disturbance into the fluid. For example, an array of extensions such as small wires extending into the fluid flow may be excited under the combined action of the flow, and the elasticity of the wires in resisting the flow, to provide the desired disturbance.

The advantages and improved results furnished by the method and apparatus of the present invention are apparent from the foregoing description of the preferred embodiment of the invention. Various changes and modifications may be made without departing from the spirit and scope of the invention as described in the appended claims.

What is claimed is:

1. A method for controlling turbulence in a wall-bounded fluid flow field having a turbulent wall region characterized by a system of roll pairs or streaks whose diameter is functionally related to the strength of the flow, and which extend in the direction of flow, and by propagating structures of coherent patterns that propagate in the direction of flow at a substantially constant group speed, said method including locally introducing into the turbulent wall region a disturbance field whose amplitude is much smaller than the size of the rolls, and whose wavelength, and direction of propagation are such that the disturbance in strongly coupled to and modifies the propagating structures in a manner that increases or decreases the interaction of the propagation structures with the system of roll pairs thereby locally increasing or decreasing the turbulence in the flow field, and wherein said amplitude is in the range of approximately 10-20 wall units, where a wall unit is $m/(sr)^{0.5}$, m being the viscosity of the fluid, s being the average frictional stress in the fluid at the wall, and r being the density of the fluid.

2. A method for controlling turbulence in a wall-bounded fluid flow field having a turbulent wall region characterized by a system of roll pairs or streaks whose diameter is functionally related to the strength of the flow, and which extend in the direction of flow, and by propagating structures of coherent patterns that propagate in the direction of flow at a substantially constant group speed, said method including locally introducing into the turbulent wall region a disturbance field whose amplitude is much smaller than the size of the rolls, and whose wavelength, and direction of propagation are such that the disturbance is strongly coupled to and modifies the propagating structures in a manner that increases or decreases the interaction of the propagating structures with the system of roll pairs thereby locally increasing or decreasing the turbulence in the flow field, and wherein said wavelength is in the range 100-300 wall units, where a wall unit is $m/(sr)^{0.5}$, m being the viscosity of the fluid, s being the average frictional stress in the fluid at the wall, and r being the density of the fluid.

3. A method according to claim 1 wherein the wavelength of said disturbance is comparable to the size of the rolls.

4. A method according to claim 3 wherein said wavelength is in the range 100-300 wall units, where a wall unit is $m/(sr)^{0.5}$, m being the viscosity of the fluid, s being the average frictional stress in the fluid at the wall, and r being the density of the fluid.

5. A method according to claim 4 wherein the direction of propagation of the disturbance is within the range of about 50°-80° of the direction of flow.

6. A method according to claim 2 wherein the direction of propagation of the disturbance is within the range of about 50°-80° of the direction of flow.

7. Apparatus for controlling turbulence in fluid flow comprising:
    (a) a wall for bounding the fluid flow which has a turbulent wall region characterized by roll pairs extending in the direction of fluid flow, and propagating structures interacting with the roll pairs; and
    (b) means associated with the wall for introducing into the wall region a disturbance whose amplitude, wavelength, and direction of propagation are such that the disturbance is coupled to the propagating structures to a degree that modifies of said propagating structures for the purpose of changing the interaction of the propagating structures with the roll pairs thereby increasing turbulent mixing or decreasing the turbulent drag;
    (c) said means associated with the wall including periodic undulations having peaks and troughs, and an array of transducers arranged in a direction perpendicular to the direction of flow, and means for periodically or aperiodically exciting the transducers in timed sequence; and
    (d) wherein said transducers are acoustic generators for introducing said disturbance into the flow when the generates are excited.

8. Apparatus for controlling turbulence in fluid flow comprising:
    (a) a wall for bounding the fluid flow which has a turbulent wall region characterized by roll pairs extending in the direction of fluid flow, and propagating structures interacting with the roll pairs; and
    (b) means associated with the wall for introducing into the wall region a disturbance whose amplitude, wavelength, and direction of propagation are such that the disturbance is coupled to the propagating structures to a degree that modifies of said propagating structures for the purpose of changing the interaction of the propagating structures with the roll pairs thereby increasing turbulent mixing or decreasing the turbulent drag;

(c) said means associated with the wall including periodic undulations having peaks and troughs, and an array of transducers arranged in a direction perpendicular to the direction of flow, and means for periodically or aperiodically exciting the transducers in timed sequence; and (d) wherein said transducers are vibration transducers for introducing said disturbance into the flow when the transducers are excited.

9. Apparatus for controlling turbulence in a wall-bounded fluid flow field having a turbulent wall region characterized by a system of roll pairs or streaks whose diameter is functionally related to the strength of the flow, and which extend in the direction of flow, and by propagating structures of coherent patterns that propagate in the direction of flow at a substantially constant group speed, said apparatus comprising:

a) disturbance means for locally introducing into the turbulent wall region a disturbance field whose amplitude, wavelength, and direction of propagation are such that the disturbance is strongly coupled to and modifies the propagating structures in a manner that increases or decreases the interaction of the propagating structures with the system of roll pairs thereby locally increasing or decreasing the turbulence in the flow field; and b) said disturbance means including transducer means for creating a disturbance field whose amplitude is in the range of approximately 10–20 wall units, where a wall unit is $m/(sr)^{0.5}$, m being the viscosity of the fluid, s being the average frictional stress in the fluid at the wall, and r being the density of the fluid.

10. Apparatus according to claim 9 wherein said transducer means is constructed and arranged so that the wavelength of said disturbance is comparable to the size of the rolls.

11. Apparatus according to claim 10 wherein said transducer means is constructed and arranged so that the wavelength is in the range 100–300 wall units, where a wall unit is $m/(sr)^{0.5}$, m being the viscosity of the fluid, s being the average frictional stress in the fluid at the wall, and r being the density of the fluid.

12. Apparatus according to claim 11 wherein said transducer means is constructed and arranged so that the direction of propagation of the disturbance is within the range of about 50°–80° of the direction of flow.

13. A method for controlling turbulence in a wall-bounded fluid flow field having a turbulent wall region characterized by a system of roll pairs or streaks whose diameter is functionally related to the strength of the flow, and which extend in the direction of flow, and by propagating structures of coherent patterns that propagate obliquely in the direction of flow at a substantially constant group speed, said method including locally introducing into the turbulent wall region a disturbance field whose amplitude in much smaller than the size of the rolls, and whose wavelength, and direction of propagation are such that the disturbance is strongly coupled to and modifies the propagating structures in a manner that increases or decreases the interaction of the propagating structures with the system of roll pairs thereby locally increasing or decreasing the turbulence in the flow field.

14. A method according to claim 13 wherein the fluid in the wall-bounded fluid flow field is air which flows near an aircraft in flight.

15. A method according to claim 13 wherein the fluid in the wall-bounded fluid flow field is water which flows near a ship in the water.

16. A method according to claim 13 wherein the fluid in the wall-bounded fluid flow field is bounded by a pipe.

17. A method according to claim 13 wherein the fluid in the wall-bounded fluid flow field is bounded by a pipe.

18. A method according to claim 13 wherein the fluid in the wall-bounded fluid flow field is the flow field in a turbine.

19. A method according to claim 13 wherein the fluid in the wall-bounded fluid flow field is the flow field in a compressor.

20. A method according to claim 13 wherein the fluid in the wall-bounded fluid flow field is the flow field in a combustion chamber.

21. Apparatus for controlling turbulence in fluid flow comprising:

(a) a wall for bounding the fluid flow which has a turbulent wall region characterized by roll pairs extending in the direction of fluid flow, and propagating structures interacting with the roll pairs; and (b) means associated with the wall for introducing into the wall region a disturbance whose amplitude, wavelength, and direction of propagation are such that the disturbance is coupled to the propagating structures to a degree that modifies of said propagating structures for the purpose of changing the interaction of the propagating structures with the roll pairs thereby increasing turbulent mixing or decreasing the turbulent drag;

(c) said means associated with the wall including an array of transducers arranged in a direction perpendicular to the direction of flow, and means for periodically or aperiodically exciting the transducers in timed sequence.

22. Apparatus for controlling turbulence in fluid flow comprising:

(a) a wall for bounding the fluid flow which has a turbulent wall region characterized by roll pairs extending in the direction of fluid flow, and propagating structures interacting with the roll pairs; and (b) means associated with the wall for introducing into the wall region a disturbance whose amplitude, wavelength, and direction of propagation are such that the disturbance is coupled to the propagation structures to a degree that modifies of said propagating structures for the purpose of changing the interaction of the propagating structures with the roll pairs thereby increasing turbulent mixing or decreasing the turbulent drag;

(c) said means associated with the wall including an array of transducers arranged in a direction perpendicular to the direction of flow, and means for periodically or aperiodically exciting the transducers in timed sequence, (d) wherein said transducers are vibration transducers for introducing said disturbance into the flow when the transducers are excited.

* * * * *